2,670,278

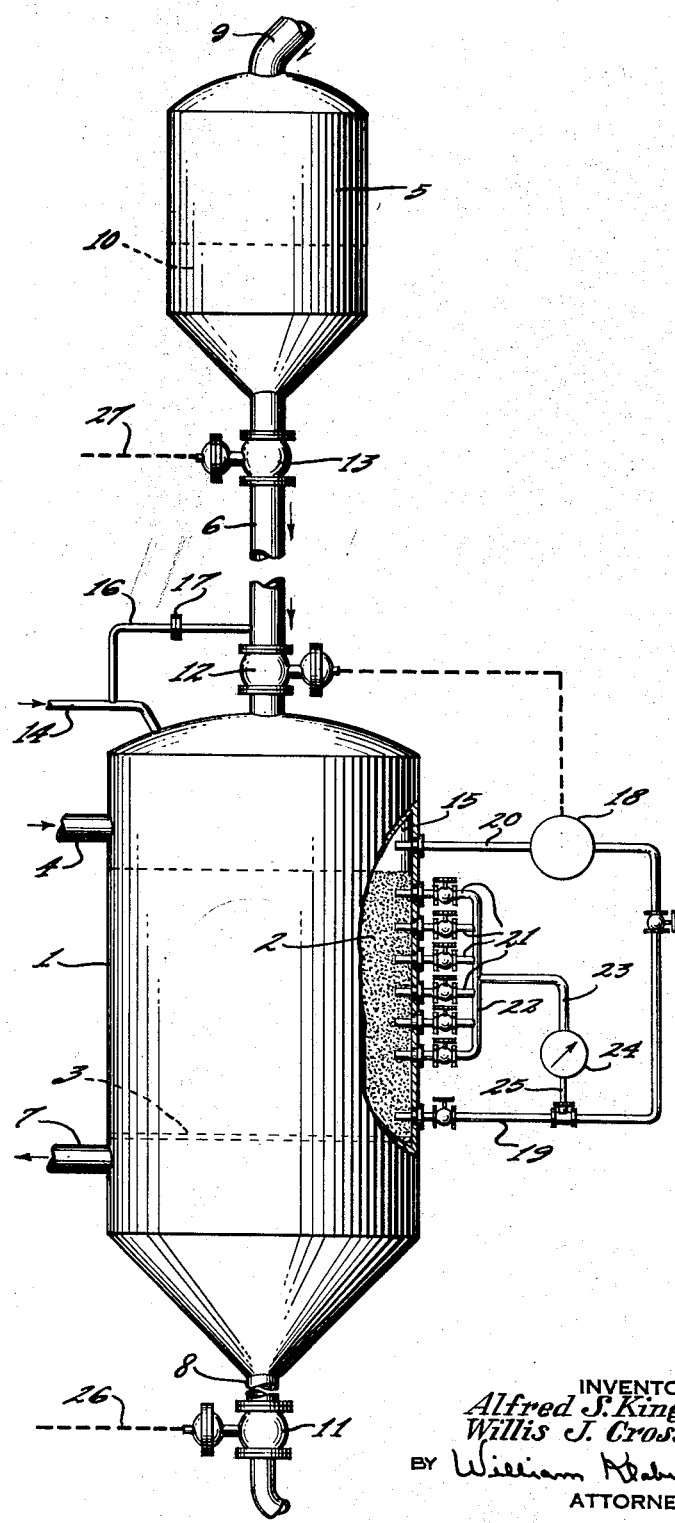
INVENTORS
Alfred S. King &
Willis J. Cross, Jr.
BY William A. Abrunde
ATTORNEY Patented Feb. 23, 1954

UNITED STATES PATENT OFFICE 2,670,278

APPARATUS FOR CONTROLLING BED DEPTH IN CONVERSION SYSTEMS

Alfred S. King, Long Beach, Calif., and Willis J. Cross, Jr., Swarthmore, Pa., assignors to Houdry Process Corporation, Wilmington, Del., a corporation of Delaware Application April 20, 1950, Serial No. 157,172

3 Claims. (Cl. 23—288)

This invention relates to a method and apparatus for indicating and controlling the depth of a bed of particulate contact material within a vessel, such as a reactor, storage hopper, etc., employed in hydrocarbon conversion or other chemical processing systems. In connection with a typical hydrocarbon conversion system, for example, solid contact material in the form of granules, pellets, etc., may be continuously passed by gravity flow along a downflow path including a reaction chamber containing a mass of the contact material in the form of a compact moving bed of predetermined depth, the contact material being introduced in a free-falling stream from an inlet at the top of the reactor and discharging by gravity flow in a continuous stream from an outlet in the bottom of the chamber.

The invention embodies an arrangement of indicator, recorder and controller devices, in association with a chamber and its connecting conduits, responsive to internal pressure differential by which the depth of solid material within the chamber may be automatically regulated and controlled. In systems operating under a condition of pressure balance such control or regulation may be effected without disturbance of the usual pressure seal provided in the conduits communicating with the contact chamber.

In accordance with the invention, a bed of granular material of substantial depth is initially formed within the chamber to be controlled, preferably at the desired operating level. Pressure determinations are then made within the bed at a point close to the bottom and at a point adjacent to the upper level. By calculation it is then possible to determine the pressure drop per unit of length, for example, the change in pressure, measured in pounds, for each foot of bed depth. The pressure drop is taken through a maximum depth of granular material, in order to minimize errors resulting from variations in pressure drop caused, in the case of hydrocarbon conversions, by localized fluctuations in bed temperature and differences in the degree of cracking at different levels within the bed. A differential pressure controller, effective between the aforesaid point close to the bottom of the bed and a point within the chamber slightly above the desired bed level, is then set to maintain a pressure differential equivalent to the desired bed depth by controlling the flow of granular material into the chamber. Such flow control may readily be effected by suitable electric or pneumatic devices arranged to operate a valve in the inlet line in response to the differential pressure controller. In systems involving the continuous withdrawal of granular material through a valve-controlled conduit connected to the lower end of the chamber, the present arrangement makes it possible to maintain a moving bed of substantially constant depth within the chamber.

When the chamber is part of a pressure balanced system, wherein there is a continuous circulation of granular material, necessitating the provision of conventional seal legs to prevent undesirable migration of gases between adjacent zones in the down-flow path, the valve regulating the admission of granular material into the chamber may be made to operate within predetermined limits, so that proper seal leg operation may be maintained. In order to maintain a substantially constant flow of seal gas into the seal leg containing the inlet valve, a seal gas by-pass including an orifice restriction is provided between the upper region of the chamber, above the bed level, and a point in the inlet line above the regulating valve. Such by-pass arrangement prevents hold-up of material at the valve, when the latter is regulated for discharge at or near its minimum limit, by reason of a high seal gas velocity through the valve opening.

For a fuller understanding of the invention reference may be had to the following description and claims taken in connection with the accompanying drawing forming a part of this application. The drawing diagrammatically illustrates the application of the invention to a typical hydrocarbon conversion system comprising a chamber for carrying out the desired reaction in the presence of a moving bed of solid catalytic material in the form of granules, pellets, etc., and an overhead supply hopper connected thereto by a conventional seal leg, these elements forming part of the downflow path of a system adapted to continuously circulate the catalyst. The other portions of the system have been omitted, since they form no part of the present invention.

Referring to the drawing, the single figure shows a reactor 1 in which the desired hydrocarbon conversion may be carried out in the presence of a mass 2 of solid catalytic material in the form of granules or pellets. The reactor vessel is provided with a partition 3 separating the reactor into an upper reaction zone and a lower purging zone. The hydrocarbons to be converted are introduced into the reaction zone through an inlet 4 in the upper portion of the reactor. The catalytic material is supplied to the reaction zone from an overhead hopper 5 through a seal leg 6 connecting the lower end of the hopper 5 with the upper end of the reactor 1. The catalyst and hydrocarbon vapors are intimately contacted in the upper region of the reactor and travel concurrently downwardly through the reaction zone. The mixture of hydrocarbons and catalyst then passes through openings in the partition 3 into the purging zone, wherein the gaseous products of reaction are separated from the catalyst. The gaseous reaction products are withdrawn from the purging zone of the reactor through outlet 7, and the catalytic material passes downwardly out of the reactor through elongated seal leg 8. Since the invention is adapted for use in systems of conventional type, the structural elements by which the hydrocarbons are distributed within the reaction zone in uniform, intimate contact with the catalytic material, and the structural elements by which the purging operation is effected, have been omitted.

The catalytic material withdrawn through seal leg 8 may be passed to other treating sections of the system and subsequently returned in condition for reuse to the hopper 5 through inlet 9. The quantity of catalyst in the system is sufficiently in excess of normal process requirements so that a substantial depth of catalyst 10 may be maintained within the hopper 5. The masses of catalyst 2 and 10 in the reactor and hopper, respectively, are maintained as compact moving beds.

The catalyst circulation rate through the entire system is controlled by a valve 11 near the lower end of seal leg 8. In order to maintain a catalyst bed of substantially constant depth within the reaction zone, the flow of catalyst from hopper 5 into the reactor is controlled by a valve 12 near the lower end of the seal leg 6. A safety valve 13 at the upper end of seal leg 6 may be used to cut off the flow of catalyst from hopper 5 into the seal leg when catalyst return through inlet 9 is insufficient to maintain a surge supply within the hopper.

In order to maintain a proper pressure balance within the system, sealing gas may be introduced into the seal legs, thus preventing undesirable migration of gases between adjacent zones. Referring specifically to the sealing means provided between the reactor 1 and the hopper 5, seal gas is introduced through inlet 14 into the upper region 15 of the reaction zone, above the upper level of the catalyst bed, the seal gas passing upwardly in seal leg 6 through valves 12 and 13 countercurrent to the passage of catalyst therein. Since the depth of bed 2 within the reaction zone is regulated by control valve 12 at the lower end of seal leg 6, there is a possibility, during periods when the valve 12 is in restricted position, that the seal gas may pass upwardly through valve 12 at a velocity high enough to impede the flow of catalyst therethrough. To obviate this possibility, a by-pass conduit 16 is provided to connect conduit 14 with seal leg 6 at a point immediately above control valve 12. To assure a constant flow of seal gas into the seal leg 6, an orifice restriction 17 is provided in the by-pass line 16.

In accordance with the invention, a preselected depth of catalytic material is maintained in bed 2 within the reaction zone by means of a differential pressure controller 18 connected to the control valve 12 electrically or pneumatically in conventional manner, and responsive to a pressure differential between a low point within the bed 2 and a point within the catalyst-free zone 15 adjacent to the upper level of the bed. Pressure taps established at these two points are connected by conduits 19 and 20, respectively, to the differential pressure controller. The pressure drop for a given depth of catalytic material is first established, and the controller 18 is then set to operate valve 12 so as to maintain the desired bed depth. For various reasons, such as temperature variations within the bed and differences in the degree of crackling severity, the pressure drop through the bed 2 may not be uniform for all increments of the bed depth. In order to obtain an average value for incremental pressure drop within the bed, the total pressure drop through a substantial depth of the bed is first determined; that is, the pressure differential between a point at the bottom and a point as close as possible to the upper level of the bed 2 is determined. To permit such determination to be made through a wide range of bed depths, a series of vertically spaced pressure taps are provided through the bed. The spaced pressure taps are connected by valve-controlled conduits 21 to a manifold conduit 22, which, in turn, is connected by conduit 23 to one side of a differential pressure indicator 24. The opposite side of indicator 24 is connected through conduit 25 to conduit 19 so that a differential pressure reading may be made between any one of the spaced pressure taps on conduits 21 and the pressure tap on conduit 19 at the bottom of the moving bed. The path of flow for this reading is through the selected valve-controlled conduit 21, the manifold conduit 22, conduit 23, differential pressure indicator 24, and the lower portion of conduit 19. Having determined the total differential pressure through a maximum of bed depth, and knowing the distance between the tap at the bottom of the bed and the selected tap near the upper level thereof, the pressure drop per foot of actual bed depth is then calculated. For each foot of desired bed depth, therefore, there will be a pressure drop equal to this calculated factor. Calculating the total pressure drop which would be provided by a bed of the desired depth, the differential pressure controller 18 is set accordingly, thus causing the bed to rise or fall to the proper level. Thereafter the controller 18 regulates the flow of material into the reactor through valve 12, thereby maintaining the desired bed depth. Since the selected bed depth corresponds to a definite pressure drop between the pressure taps associated with conduits 19 and 20, a decrease in pressure between these points will cause controller 18 to adjust valve 12 for increased flow of granular material, and, conversely, an increase in pressure between said points will cause valve 12 to throttle the flow of material into the reactor.

Exemplifying a typical operation, vessel 1 may represent a reactor in a system catalytically converting hydrocarbons, through which catalyst is continuously passed downwardly by gravity flow as a moving bed. The catalyst is introduced into the reactor 1 from the overhead storage hopper 5 and, passing downwardly though the vessel, is withdrawn from the reactor through seal leg 8. The catalyst may then be regenerated in the usual manner and returned to the hopper 5 by suitable mechanical or pneumatic elevating means, the regenerating, storing, and elevating means not being shown in the drawing. The catalyst circulates through the system continuously, the rate of circulation being controlled by the valve 11 at the foot of seal leg 8. Assuming a capacity for processing 10,000 barrels of feed stock per day, a constant flow of catalyst from the reactor to the kiln elevator or lift of 100 tons per hour may be maintained. The flow of catalyst to the reactor will be restricted by valve 12 to cause the catalyst bed 2 in the reactor to rise or fall, as the case may be, to the desired level, as determined by the setting of controller 18. Thereafter, valve 12 is controlled to balance the output of valve 11, so as to maintain the desired bed depth and a catalyst circulation of approximately 100 tons per hour. Although not shown in the drawing, it may be assumed that conventional provision is made to accommodate any excess of catalyst, as by a hopper and hot bin. Should the bed level fall below a preselected limit, valve 12 will open to its maximum position, as limited by proper seal operation, thus permitting additional catalyst to flow into the reactor to raise the bed depth to the desired level. During such adjustment valve 11 continues to pass its usual constant amount. It is to be understood, of course, that any additional catalyst required must be available in the system or in storage. To safeguard against a situation in which the level of bed 10 within hopper 5 should fall below a safe minimum, conventional safety devices are provided for shutting off the flow of catalyst into the seal leg 6 through valve 13, and out of seal leg 8 through valve 11. Control lines 26 and 27, associated with valves 11 and 13 respectively, connect the same to such safety control devices. Thus, automatic cut-off prevents beds 10 and 2 from being drained from their respective vessels.

While the invention has been described particularly in connection with a system for handling granular material in which the pressure drop is substantially a direct linear function of the bed depth, it is contemplated that the control system of the present invention may readily be adapted to operate successfully when, for any reason, the characteristics of bed 2 under contacting conditions may change so as to cause a change in differential pressure insufficient to actuate the controller 18. In such case, it is contemplated that, as a safety measure, an additional differential pressure controller may be connected between the upper tap in the reaction zone, and one of the intermediate series of taps selected as the point of minimum bed depth. Such supplementary controller may then be set to open inlet valve 12 when there is a condition of zero pressure differential between the two selected pressure taps.

Further, it is to be understood that although the specific embodiment described and illustrated in the drawing discloses a system in which the bed level is adjusted by means of a differential pressure controller associated with the catalyst inlet valve above the reactor, bed level adjustment may also be made by using the differential pressure controller to regulate the outlet valve below the reactor. Or, if desired, the differential pressure controller may be used to operate a flow control means at some remote point in the circulatory system, which will adjust the catalyst circulation rate so as to raise or lower the reactor bed level.

Obviously many modifications and variations of the invention as hereinbefore set forth may be made without departing from the spirit and scope thereof and therefore only such limitations should be imposed as are indicated in the following claims.

What we claim is:

1. In a hydrocarbon conversion system wherein gaseous reactants flow through a compact moving bed of granular contact material gravitating through a contact zone, means for controlling the depth of said moving bed comprising a vessel containing said contact zone, adjustable flow control means at the upper and lower ends of said vessel for controlling, respectively, the supply of granular material into and the discharge thereof from said vessel, a plurality of pressure-transmitting means vertically spaced along a side of said vessel, the uppermost of said pressure-transmitting means being located in the upper region of said vessel and the lowermost thereof being located at the bottom of said bed, a differential-pressure indicator selectively connectable between the lowermost and any of the intermediate pressure-transmitting means, and a differential-pressure controller connected between said uppermost and said lowermost pressure-transmitting means for regulating in response to the differential pressure therebetween one of said adjustable flow control means.

2. Apparatus as defined in claim 1 in which said differential-pressure controller is adapted to regulate said adjustable flow control means at the upper end of said vessel.

3. Apparatus as defined in claim 1 in which said uppermost pressure-transmitting means in the upper region of said vessel is located above the maximum desired level of said bed.

ALFRED S. KING.
WILLIS J. CROSS, Jr.

References Cited in the file of this patent

UNITED STATES PATENTS

| Number | Name | Date |
| --- | --- | --- |
| 2,327,175 | Conn | Aug. 17, 1943 |
| 2,331,208 | Ludi | Oct. 5, 1943 |
| 2,438,728 | Tyson | Mar. 30, 1948 |
| 2,475,404 | Reed | July 5, 1949 |

FOREIGN PATENTS

| Number | Country | Date |
| --- | --- | --- |
| 806,266 | France | Dec. 11, 1936 |